United States Patent [19]

Scheuble et al.

[11] Patent Number: 5,030,383
[45] Date of Patent: Jul. 9, 1991

[54] ELECTROOPTICAL DISPLAY ELEMENT

[75] Inventors: Bernhard Scheuble, Yokohama; Reinhard Hittich, Modautal; Rudolf Eidenschink, Mühltal, all of Fed. Rep. of Germany

[73] Assignee: Merck Patent Gesellschaft Mit Beschrankter Haftung, Darmstadt, Fed. Rep. of Germany

[21] Appl. No.: 132,548

[22] PCT Filed: Feb. 17, 1987

[86] PCT No.: PCT/EP87/00091
§ 371 Date: Oct. 30, 1987
§ 102(e) Date: Oct. 30, 1987

[87] PCT Pub. No.: WO87/05318
PCT Pub. Date: Sep. 11, 1987

[30] Foreign Application Priority Data

Mar. 1, 1986 [DE] Fed. Rep. of Germany ....... 3606787

[51] Int. Cl.$^5$ .............................................. C09K 19/34
[52] U.S. Cl. ........................... 252/299.61; 252/299.01; 252/299.5; 252/299.6; 252/299.63; 252/299.64; 252/299.65; 252/299.66; 252/299.67; 350/350 R; 350/350 S
[58] Field of Search ............ 252/299.01, 299.5, 299.6, 252/299.61, 299.63, 299.64, 299.65, 299.66, 299.67; 350/350 R, 350 S

[56] References Cited

U.S. PATENT DOCUMENTS

| | | | |
|---|---|---|---|
| 4,528,116 | 7/1985 | Dabrowski et al. | 252/299.63 |
| 4,551,280 | 11/1985 | Sasaki et al. | 252/299.63 |
| 4,621,901 | 11/1986 | Petrzilfa et al. | 252/299.63 |
| 4,622,162 | 11/1986 | Kimura et al. | 252/299.63 |
| 4,659,500 | 4/1987 | Sugimori et al. | 252/299.61 |
| 4,670,182 | 6/1987 | Fujita et al. | 252/299.63 |
| 4,676,924 | 6/1987 | Dabrowski et al. | 252/299.61 |
| 4,693,562 | 9/1987 | Hasegawa et al. | 252/299.01 |
| 4,710,315 | 12/1987 | Schad et al. | 252/299.63 |
| 4,756,847 | 7/1988 | Yoshida et al. | 252/299.61 |
| 4,776,975 | 10/1988 | Sawada et al. | 252/299.61 |

FOREIGN PATENT DOCUMENTS

| | | | |
|---|---|---|---|
| 168012 | 1/1986 | European Pat. Off. | 252/299.61 |
| 169327 | 1/1986 | European Pat. Off. | 252/299.63 |
| 3500909 | 7/1986 | Fed. Rep. of Germany | 252/299.61 |
| 58-191780 | 11/1983 | Japan | 252/299.63 |
| 60-101183 | 6/1985 | Japan | 252/299.63 |
| 60-260683 | 12/1985 | Japan | 252/299.63 |
| 61-87778 | 5/1986 | Japan | 252/299.63 |
| 61-281192 | 12/1986 | Japan | 252/299.61 |
| 63-92689 | 4/1988 | Japan | 252/299.61 |
| 8603769 | 7/1986 | PCT Int'l Appl. | 252/299.61 |
| 8604081 | 7/1986 | PCT Int'l Appl. | 252/299.01 |
| 8605799 | 10/1986 | PCT Int'l Appl. | 252/299.63 |
| 8802018 | 3/1988 | PCT Int'l Appl. | 252/299.63 |

*Primary Examiner*—John S. Maples
*Assistant Examiner*—Richard Treanor
*Attorney, Agent, or Firm*—Millen, White & Zelano

[57] ABSTRACT

The invention relates to a liquid crystal display element with a particularly low temperature-dependence of the threshold voltage.

16 Claims, No Drawings

ELECTROOPTICAL DISPLAY ELEMENT

The invention relates to electrooptical display elements with a particularly low temperature-dependence of the threshold voltage.

The properties of nematic or nematic-cholesteric liquid crystal materials of modifying their optical properties, such as light absorption, light scattering, birefringence, reflectivity or color, under the influence of electrical fields are utilized for LC display elements. The functioning of such display elements is here based, for example, on the phenomena of dynamic scattering, deformation of aligned phases, the guest-host effect, the Schadt-Helfrich effect in the twisted cell, the SBE effect or the cholesteric-nematic phase transition.

LC phases which must meet a large number of requirements are needed for technical application of these effects in electronic components Chemical stability towards moisture, air and physical influences, such as heat, radiation in the infrared, visible and ultraviolet range and towards constant and alternating electric fields, is particularly important here. LC phases which can be used industrially are also required to have a liquid crystal mesophase in a suitable temperature range, a low viscosity, a low optical anisotropy, a low temperature-dependence of the threshold voltage, a high gradient to the electrooptical characteristic line and a sufficient dissolving power for pleochroic dyestuffs.

In none of the series of compounds with a liquid crystal mesophase which are known to date is there an individual compound which meets all these requirements.

Mixtures of two to 25, preferably three to 18, compounds are therefore as a rule prepared in order to obtain substances which can be used as LC phases. However, optimum phases cannot be easily prepared in this manner, since components with high melting and clear points frequently also impart a high viscosity to the mixtures. The switching times of the electrooptical display elements produced with the mixtures are thereby modified in an undesirable manner.

Highly polar nematic compounds with terminal cyano groups are added to the LC phases known to date in order to reduce the threshold voltage. The effective dipole moment of these compounds, however, is significantly reduced by the greater or lesser antiparallel association of these molecules, so that relatively large amounts of polar compounds have to be added. This again results in many different disadvantages, such as an undesirable temperature-dependence of the threshold voltage, adverse elastic properties of the LC phases and a high viscosity. When 4-cyano-3-fluorophenyl p-alkyl-benzoates were added as highly polar components to ZLI-1957/5 (commercially available mixture from E. Merck, Darmstadt, containing phenylcyclohexane, cyclohexylbiphenyl and bis-cyclohexylbiphenyl compounds and phenyl cyclohexylbenzoate), it was to be found (Hp. Schad and S. M. Kelly, J. Chem. Phys. 81 (3), 1514-15 (1984)) that the threshold voltage is reduced, which is explained by a reduced degree of association of the compounds added. However, these LC phases do not meet all the above requirements at once either. In particular, they still have a temperature-dependence of the threshold voltage which is too high for many applications and still have threshold voltages which are too high for some fields of application, and moreover the gradients of the characteristic lines are not sufficient for highly informative displays because of the relatively high ratio of the elastic constants for the bending ($K_3$) and the spreading ($K_1$) $K_3/K_1$. The mixtures known to date therefore have too high a temperature-dependence of the threshold voltage and in some cases too high a threshold voltage and/or too poor a characteristic line gradient (characterized by too high a $K_3/K_1$ value). Furthermore, mixtures known to date with a low threshold voltage have smecticnematic transition temperatures which are too high.

There is therefore still a great need for liquid crystal phases with high clear points, low melting points, a low viscosity (and therefore short switching times) and a low temperature-dependence of the threshold voltage, and if appropriate a low threshold voltage and/or favorable elastic properties.

The invention is based on the object of providing LC display elements which have a broad operating temperature range and display the abovementioned disadvantages to only a minor degree, if at all.

It has been found that LC display elements with particularly favorable electrooptical properties, in particular with an exceptionally low temperature-dependence of the threshold voltage, are obtained if they contain a liquid crystal phase with at least one component (A) with a reduced degree of association, at least one component chosen from group B, consisting of the compounds of the formula I and II

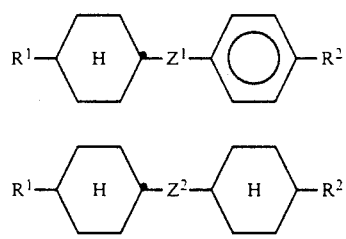

in which $R^1$ and $R^2$ each independently of one another are alkyl with 1 to 7 C atoms, in which one or two non-adjacent $CH_2$ groups can also be replaced by —O—, —CO—, —O—CO—, —CO—O— and/or —CH=CH— (trans) and $Z^1$ and $Z^2$ are each —CO—O—, —CH$_2$—O, —CH$_2$CH$_2$— or a single bond, at least one component selected from group C consisting of the compounds of the formula III to VI

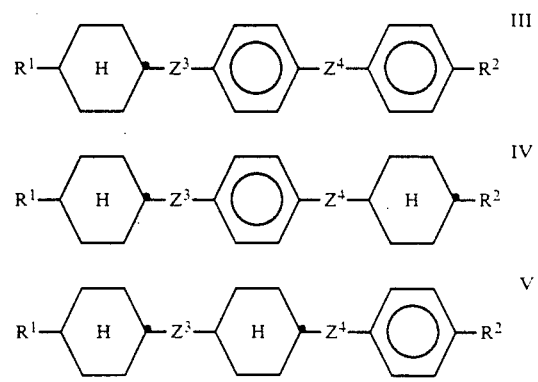

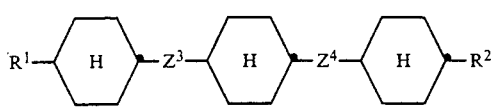

VI in which
R$^1$ and R$^2$ each independently of one another are alkyl with 1 to 7 C atoms, in which one or two non-adjacent CH$_2$ groups can also be replaced by —O—, —CO—, —O—CO—, —CO—O— and/or —CH=CH— (trans), and Z$^3$ and Z$^4$ each independently of one another are —CO—O—, —O—CO—, —CH$_2$CH$_2$— or a single bond, and/or at least one component selected from the group D consisting of the compounds of the formulae VII to XI

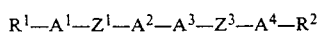 VII

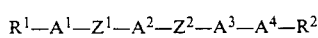 VIII

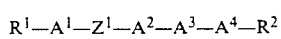 IX

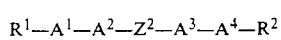 X

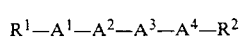 XI in which
R$^1$ and R$^2$ each independently of one another are alkyl with 1 to 7 C atoms, in which one or two non-adjacent CH$_2$ groups can also be replaced by —O—, —CO—, —O—CO—, —CO—O— and/or —CH=CH— (trans), A$^1$, A$^2$,
A3 and A4 each independently of one another are trans- 1,4-cyclohexylene or 1,4-phenylene which is unsubstituted or substituted by one or two F or Cl atoms and/or CH$_3$ or CN groups, Z$^1$, Z$^2$ and Z$^3$ each independently of one another are —CO—O—, —O—CO—, —CH$_2$CH$_2$—, —CH$_2$O—, —OCH$_2$— or a single bond.

By compounds with a reduced degree of association there are to be understood here those liquid crystal compounds which, with a similar overall dipole moment of the molecule (from vector addition of the individual dipole moments of the structural elements), exhibit a higher dielectric anisotropy by reduced antiparallel association of the molecular compounds than, for example, compounds such as 4-alkyl-4'-cyanobiphenyls or p-trans-4-alkylcyclohexyl-benzonitriles.

The invention thus relates to an LC display element containing a liquid crystal phase described above. The invention furthermore relates to LC display elements as claimed in claim 1, wherein in that the dielectric contains at least one component of the formula (1)

 (1)

in which
R is alkyl with 2 to 9 C atoms, in which one or two non-adjacent CH$_2$ groups can also be replaced by —O—, —CO—, —O—CO—, —CO—O—and/or —CH=CH (trans), Z' and Z" are each —CO—O—, —O—CO—, —CH$_2$CH$_2$, CH$_2$O, —OCH$_2$— or a single bond, n is 0, 1 or 2, Q$^1$ and Q$^2$ each independently of one another are trans- 1,4-cyclohexylene, in which one or two non-adjacent CH$_2$ groups can also be replaced by —O— —and/or —S—, or 1,4-phenylene, in which one or more CH groups can also be replaced by N, and Q$^4$ is 3-halogeno-4-cyanophenyl, 3-halogeno-4-isothiocyanatophenyl, 3,4-dihalogenophenyl, p-nitrophenyl, trans-4-nitrocyclohexyl, trans-4-isothiocyanatocyclohexyl or p-isothiocyanatophenyl, and LC display elements, the dielectric of which additionally contains at least one component of one of the formulae XII to XVII and/or at least one component of the formulae XVIII to XXV

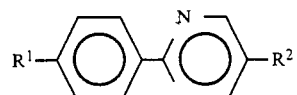 XII

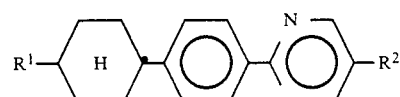 XIII

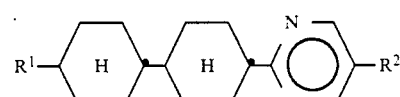 XIV

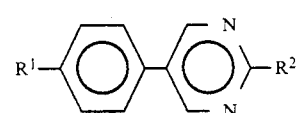 XV

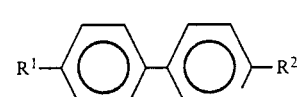 XVI

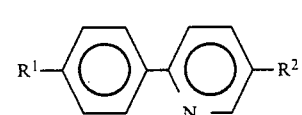 XVII in which
R$^1$ and R$^2$ each independently of one another are alkyl with 1 to 10 C atoms, in which one or two non-adjacent CH$_2$ groups can also be replaced by —O—, —CO—, —O—CO—, —CO—O— and/or —CH=CH— (trans).

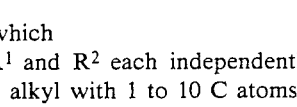 XVIII

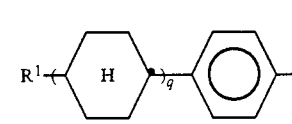 XIX

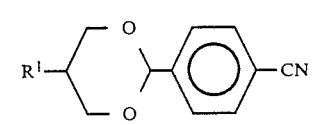 XX

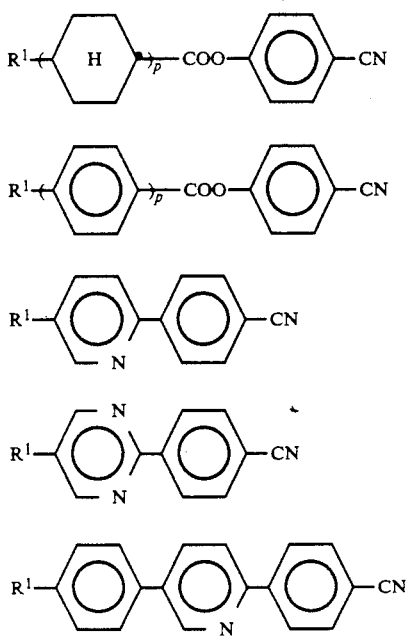

in which
R¹ is alkyl with 1 to 10 C atoms, in which one or two non-adjacent CH₂ groups can also be replaced by —O—, —CO—, —O—CO—, —CO—O—and/or —CH=CH—(trans), and p is 1 or 2 and
q is 0, 1 or 2.

The invention furthermore relates to an LC display element which, alongside components selected from group A, B, C, D or E, contains less than 3% of components with a significantly positive dielectric anisotropy ($\Delta\epsilon > 5$).

The invention furthermore relates to liquid crystal display elements which contain, as the dielectric, a guest-host system containing one or more dyestuffs and an LC phase as described above.

In principle, all the pleochroic dyestuffs suitable for guest-host mixtures can be used as dyestuffs. The most important of these dyestuffs belong to the classes of anthraquinone, naphthoquinone, azo, indigo and/or perylene dyestuffs.

A wide diversity of these is described in the literature. The expert can seek out the dyestuffs most suitable for the particular intended use without difficulty. Thus, for example, anthraquinone dyestuffs are described in European Patent 34,832, European Patent 44,893, European Patent 48,583, European Patent 54,217, European Patent 56,492, European Patent 59,036, British Patent 2,065,158, British Patent 2,065,695, British Patent 2,081,736, British Patent 2,082,196, British Patent 2,094,822, British Patent 2,094,825, Japanese Offenlegungsschrift 55-123,673, Japanese Offenlegungsschrift 56-112,967, Japanese Offenlegungsschrift 57-165,456, Japanese Offenlegungsschrift 59-020,355, German Patent 3,017,877, German Patent 3,040,102, German Patent 3,048,552, German Patent 3,100,533, German Patent 3,115,147, German Patent 3,115,762, German Patent 3,150,803, German Patent 3,201,120 and German Patent 3,309,045, naphthoquinone dyestuffs are described in German Patents 3,126,108 and 3,202,761, azo dyestuffs are described in European Patent 43,904, German Patent 3,123,519, German Patent 3,245,751, German Patent 3,309,048, PCT WO 82/2054, British Patent 2,079,770, Japanese Offenlegungsschrift 56-57-850, Japanese Offenlegungsschrift 56-104,984, Japanese Offenlegungsschrift 55-052,375, Japanese Offenlegungsschrift 59-096,171, Japanese Offenlegungsschrift 59-093,776, U.S. Pat. No. 4,308,161, U.S. Pat. No. 4,308,162, U.S. Pat. No. 4,340,973, T. Uchida, C. Shishido, H. Seki and M. Wada: Mol. Cryst. Liq. Cryst. 39, 39-52 (1977) and H. Seki, C. Shishido, S. Yasui and T. Uchida: JPn. J. Appl. Phys. 21, 191-192 (1982) and perylenes are described in European Patent 60,895, European Patent 68,427 and PCT WO 82/1191.

By suitable choice of the dyestuff components and the relative dyestuff concentrations, the guest-host systems according to the invention can be adapted to suit the most diverse fields of use.

The dielectrics which can be used according to the invention are prepared in a manner which is customary per se. As a rule, the desired amount of the components used in the smaller amount is dissolved in the components which make up the main constituent, advantageously at elevated temperature. It is also possible to mix solutions of the components in an organic solvent, for example in acetone, chloroform or methanol, and to remove the solvent again, for example by distillation, after thorough mixing.

The dielectrics can also contain other additives which are known to the expert and are described in the literature. For example, it is possible to add 0-15% of pleochroic dyestuffs, and furthermore conductive salts, preferably ethyl-dimethyldodecylammonium 4-hexoxybenzoate, tetrabutylammonium tetraphenylboronate or complex salts of crown ethers (compare, for example, Haller et al., Mol. Cryst. Liq. Cryst. volume 24, pages 249-258, (1973)) to improve the conductivity or substances for modifying the dielectric anisotropy, the viscosity and/or the orientation of the nematic phases. Such substances are described, for example, in German Offenlegungsschriften 2,209,127, 2,240,864, 2,321,632, 2,338,281, 2,450,088, 2,637,430 and 2,853,728.

The individual components of the formula (1) and I to XXV of the liquid crystal phases according to the invention are either known, or their preparation procedures can easily be deduced from the prior art by the appropriate expert, since they are based on standard processes described in the literature.

Corresponding compounds of the formula (1) are described, for example, in German Patent Applications P 34 05 914, P 34 01 320, P 34 11 571 and P 33 15 295; in German Offenlegungsschrift 3,209,178; in European Patent Specification EP-PS 0,019,665; in S. M. Kelly and Hp. Schad, Helvetica Chimica Acta, 67, 1580-1587 (1984); in S. M. Kelly, loc. cit., 67, 1572-1579 (1984); in European Offenlegungsschriften EP-OS 0,099,099 and EP-OS 0,119,756. Corresponding non-polar liquid crystal components are described, for example, in German Patent Applications P 33 15 295, P 33 46 175, P 34 01 320, P 34 01 321, P 34 04 116 and P 34 11 571; in German Offenlegungsschriften 2,167,252, 2,257,588, 2,429,093, 2,547,737, 2,641,724, 2,944,905, 2,951,099, 3,140,868 and 3,228,350; in European Offenlegungsschriften 0,014,885, 0,084,194, 0,104,011, 0,111,695, 0,122,389 and 0,126,883 and in Japanese Offenlegungsschrift 59-98,065.

In the compounds of the formula (1), R is preferably straight-chain alkyl or oxaalkyl with 2 to 7 C atoms, Z' is preferably a single bond, Z" is preferably —CO—O—, —CH₂O— or a single bond, n is preferably 0 or 1, $Q^1$ is preferably trans-1,4-cyclohexylene, 1,4-phenylene or pyrimidine-2,5-diyl, $Q^2$ is preferably trans-1,4-cyclohexylene or, particularly preferably, 1,4-phenylene and $Q^4$ is preferably 3-halogeno-4-cyanophenyl or p-isothiocyanatophenyl, 3-fluoro-4-cyanophenyl being particularly preferred. Halogen is preferably fluorine.

Surprisingly, it is found that the combination according to the invention of components with positive dielectric anisotropy and a reduced degree of association, in particular those compounds of the formula (1) and nonpolar components selected from the group B and from group C and/or D gives LC phases which on the one hand have broad mesophase ranges with low melting points and low smecticnematic transition temperatures, and also, with an exceptionally low temperature-dependence of the threshold voltage, are characterized by particularly favorable ratios $K_3/K_1$ of the elastic constants for the bending ($K_3$) and the spread ($K_1$) and/or particularly low threshold voltages.

The LC phases of the LC display elements according to the invention preferably contain at least five components, particularly preferably at least two components, of the formula (1) and at least two, preferably at least four and in particular at least six, nonpolar components.

The total amount of compounds of the formulae (1) is preferably 10 to 50%.

Preferred compounds of the formula (1) are those of the part formulae 1a to 1u:

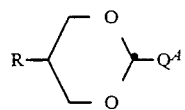  1a

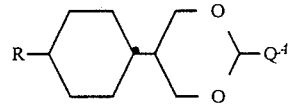  1b

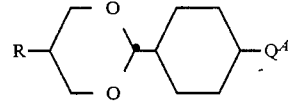  1c

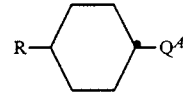  1d

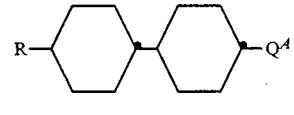  1e

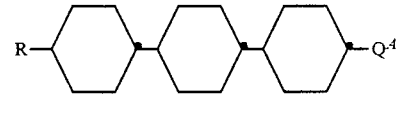  1f

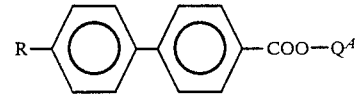  1g

-continued

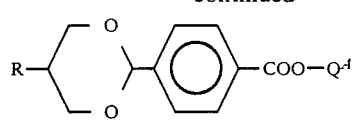  1h

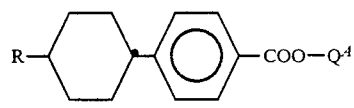  1i

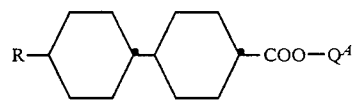  1j

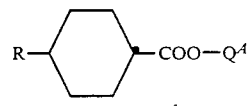  1k

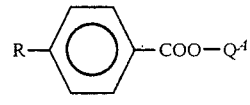  1l

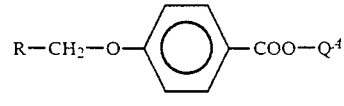  1m

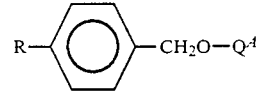  1n

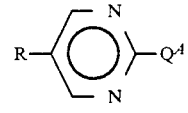  1o

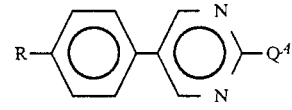  1p

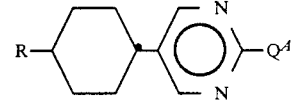  1q

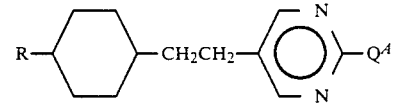  1r

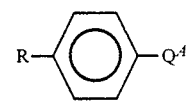  1s

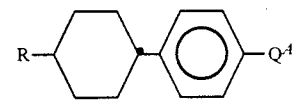  1t

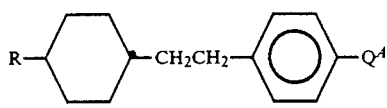                                                                                                1u Amongst the above part formulae, those of the formulae 1a, 1b, 1d, 1e, 1g, 1i, 1k, 1l, 1m and 1o are preferred. Those of the part formulae 1e, 1g, 1i, 1l, 1o and 1t are particularly preferred.

Preferred LC phases according to the invention contain at least one, preferably at least two, compounds of the formula (1) in which n is 0 and at the same time at least one compound of the formula I in which n is 1.

The non-polar liquid crystal components preferably have a dielectric anisotropy in the range from $-2$ to $+2$, in particular in the range from $-1.5$ to $+1$.

For example, compounds of the formulae A or I in which alkyl and alkoxy

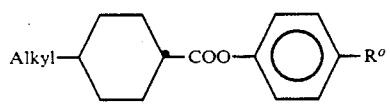                                                                                                A

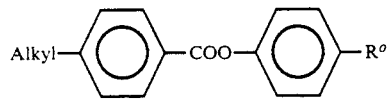                                                                                                B

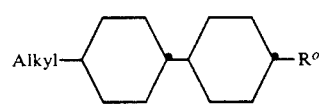                                                                                                C

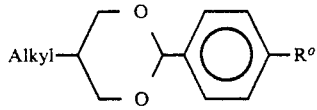                                                                                                E

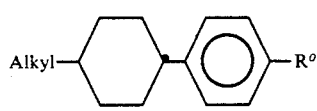                                                                                                F

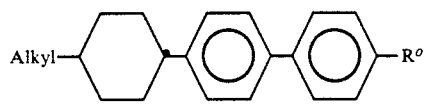                                                                                                G

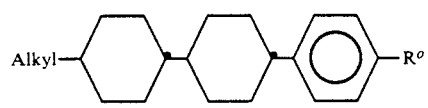                                                                                                H

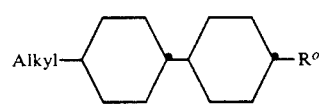                                                                                                I (sic) each are a straight-chain alkyl or alkoxy group with 1 to 7 C atoms and $R^o$ is a straight-chain alkyl or alkoxy group or an oxaalkyl or alkenyl group with 1 to 7 C atoms, can be used.

Particularly preferred phases contain at least one component of the formulae H and/or I.

Nitro compounds, which can be prepared by methods which are known from the literature, are also suitable as components or dielectrics of the LC display elements according to the invention, for example those of the following formulae or their homologs or similar compounds:

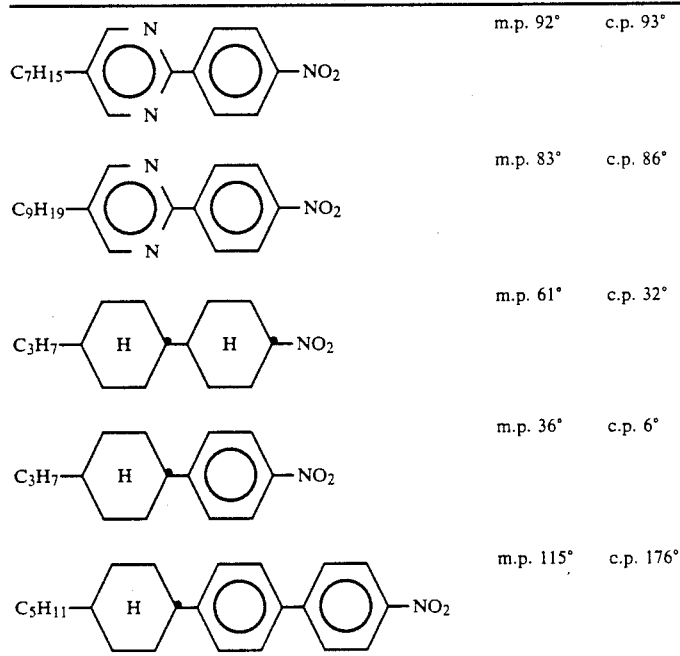

The group B of non-polar compounds of the formulae I and II preferably comprises components of the following part formulae:

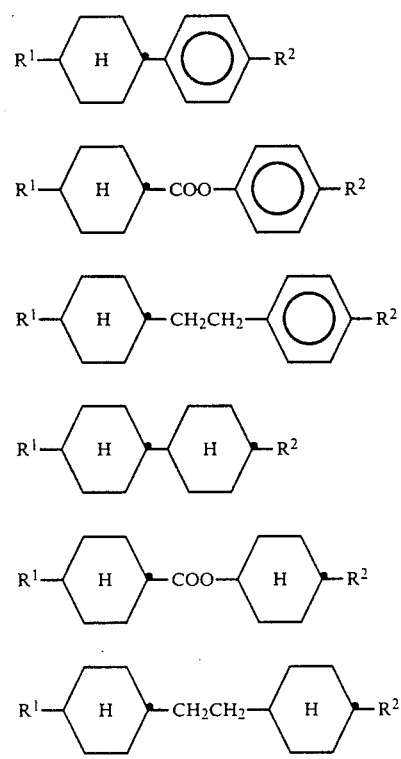

R[1] and R[2] preferably each independently of one another are straight-chain alkyl, alkoxy, oxaaalkyl, alkanoyloxy or trans-alkenyl with preferably in each case 2 to 7 C atoms. Preferably, R[1] is alkyl or oxaalkyl and R[2] is alkyl, alkoxy or oxaalkyl.

Compounds of the part formulae Ia and IIa are particularly preferred, especially those in which R[1] is straight-chain alkyl with 2 to 5 C atoms and R[2] is straight-chain alkyl, alkoxy, oxaalkyl (for example alkoxymethyl) or alkanoyloxy with in each case 2 to 5 C atoms.

The amount of components from group B is preferably 10 to 60%, especially 26 to 50%. The phases preferably contain at least two, in particular three to six, components from group B.

Group C of non-polar compounds of the formulae III to VI comprises preferred components of the following part formulae:

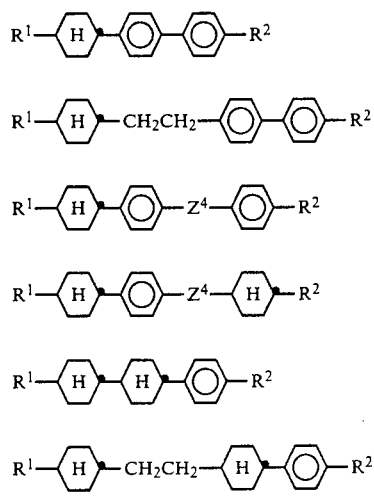

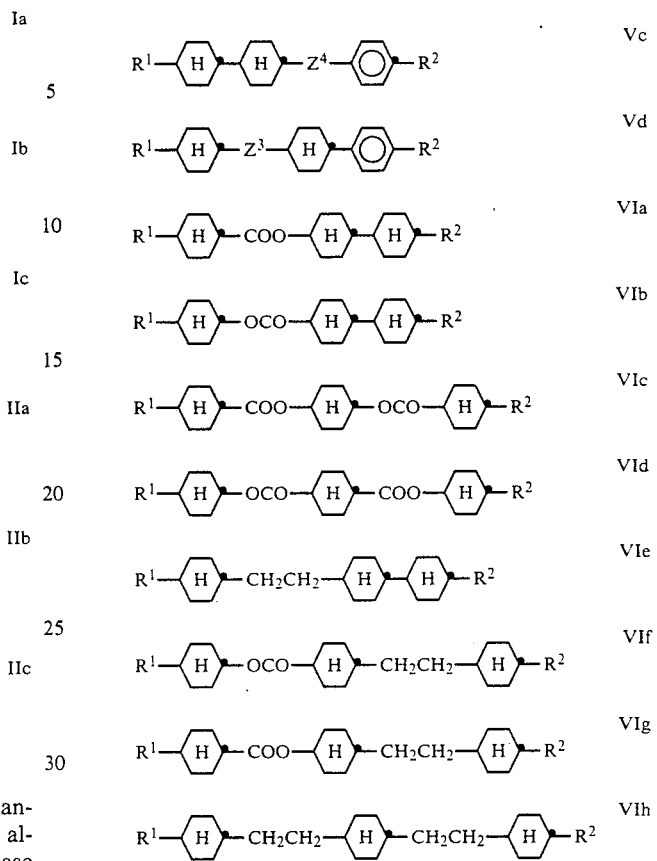

R[1] and R[2] preferably each independently of one another are straight-chain alkyl, alkoxy, oxaaalkyl, alkanoyloxy or trans-alkenyl with preferably in each case 2 to 7 C atoms. Preferably, R[1] is alkyl or oxaalkyl and R[2] is alkyl, alkoxy or oxaalkyl.

Group D of non-polar components of the formula VII to XI comprises preferred compounds of the part formulae:

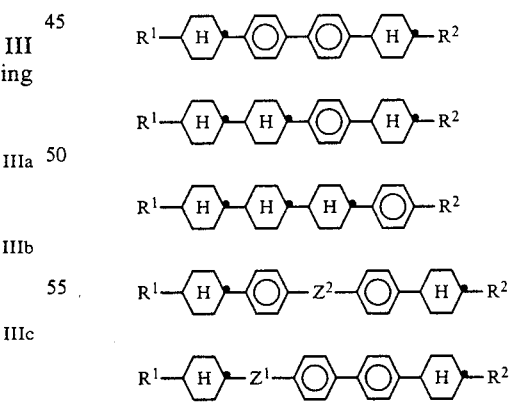

and laterally monofluorinated analogs.

Preferred compounds from group E are those of the formulae XII, XIII, XIV and XVII. In the compounds of the formulae XIII and XIV, R[1] and R[2] each independently of one another are preferably straight-chain alkyl with preferably 2 to 7 C atoms. In the compounds of the formulae XII, XV, XVI and XVII, R[1] is preferably straight-chain alkyl, alkoxy or alkanoyloxy with 2 to 7

C atoms; R² is preferably straight-chain alkyl with 2 to 7 C atoms.

The amount of components with a clearly positive dielectric anisotropy ($\Delta\epsilon > 5$) alongside those components of group A can be between 0 and 20%. This amount is preferably not more than 10%, and especially not more than 7%. The amounts are particularly preferably not more than 5%, in particular not more than 3%. Phases which contain no other positive materials alongside components of group A (preferably components of the formula (1)) are especially preferred. Possible components with $\Delta\epsilon > 5$ are, alongside those of group A, preferably those of group F.

Preferred compounds from group F are those of the formulae XVIII, XIX (q is preferably 1), XX, XXII, XXIII and XXIV. R¹ with 2 to 7 C atoms.

The concept according to the invention for reducing the temperature-dependence of the threshold voltage of LC display elements can in principle be applied to LC display elements for the most diverse fields of use, for example displays with static control or a low multiplex ratio. However, LC display elements which contain wide-range mixtures or wide-range mixtures of low threshold voltage (for example for external applications) or HMPX multiplex mixtures (for highly informative displays) are preferred. The wide-range mixtures for the LC display elements according to the invention preferably contain components of groups A, B, C and D. They can also additionally contain components of group F, but preferably in an amount of not more than 10%. They preferably contain at least two, in particular at least three, compounds of the formula (1), preferably in an amount of 5 to 20%, preferably 10–14%. The amount of components from group B (preferably at least 3, in particular at least 4 compounds) is preferably 35 to 55%, in particular 43 to 50%. The amount of components from group C (preferably at least two compounds) is preferably 10 to 30%, in particular 16 to 23%. However, wide-range mixtures which contain only components from group B or C alongside components of groups A and B are also possible. The amount of components from group D (preferably at least 4 compounds) is preferably 12 to 30%, in particular 16 to 24%.

The wide-range mixtures with a low threshold voltage for the LC display elements according to the invention preferably contain components from groups A, B, C and D. They can also additionally contain components from group F, but preferably in an amount of not more than 10%. They preferably contain at least four, in particular at least seven, compounds of the formula (1), preferably in an amount of 30 to 60%, preferably 37 to 50%. Preferably, several compounds of the formula (1) in which n is 0 and at the same time several compounds of the formula (1) in which n is 1 are present. The amount of components of group B (preferably at least 2) is preferably 20 to 50%, in particular 26 to 38%. The amount of components from group C (preferably at least two compounds) is preferably 5 to 20%, in particular 5 to 10%. However, wide-range mixtures which contain only components from group B or C alongside components from groups A and D are also possible. The amount of components from group D (preferably at least 4 compounds) is preferably 12 to 30%, in particular 16 to 24%.

The HMPX multiplex mixtures for the LC display elements according to the invention contain, alongside components from group A, those from group E (preferably at least 4 compounds), preferably in an amount of 15 to 45%, in particular 20 to 30%. These HMPX mixtures furthermore preferably contain components from group B (preferably at least two components) in an amount of 20 to 45%, in particular 26 to 36%. One or more compounds from group C (preferably about 15 to 25%) can additionally be represented. The amount of components from group D is preferably 3 to 20%, in particular 4 to 10%. In addition, components from group F can also be present, but preferably in an amount of not more than 10%.

The sum of the amounts of components from the various groups is usually 100%. However, it is also possible for the dielectrics to contain small amounts (up to not more than about 10 to 20%) of other materials (preferably other liquid crystal materials), alongside the components from the groups A to F described.

The temperature-dependence of the threshold voltage in the LC display elements according to the invention is preferably not more than 0.5%/°C., in particular not more than 0.3%/°C., based on the threshold voltage, for the temperature range from 0° to 40° C. LC display elements with a temperature-dependence of the threshold voltage of not more than 0.15%/°C. are particularly preferred.

The following examples are intended to illustrate the invention without limiting it.

The symbols in the examples have the following meanings:

| | |
|---|---|
| S-N | smectic-nematic phase transition temperature in degrees Celsius, |
| cp. | clear point, in degrees Celsius, |
| visc. | viscosity at 20° (mPa · s), |
| tv | threshold voltage of a TN cell at 20°, observation angle 0° (perpendicular) and 10% contrast. |
| TD. | Temperature dependence of the threshold voltage (mV/degrees C.) |
| $K_3/K_1$ | ratio of the elastic constants for bending and spread |
| $\Delta n$ | birefringence |

All the temperatures above and below are given in °C. The percentage figures are percentages by weight.

EXAMPLE 1

A mixture of

5% of 3-fluoro-4-cyanophenyl p-ethylbenzoate,
5% of 3-fluoro-4-cyanophenyl p-propylbenzoate,
20% of trans-1-p-methoxyphenyl-4-propylcyclohexane,
11% of trans,trans-4-propoxy-4'-propylcyclohexylcyclohexane,
14% of trans,trans-4-methoxy-4'-pentylcyclohexylcyclohexane,
5% of trans,trans-4-ethoxy-4'-pentylcyclohexylcyclohexane,
4% of trans-4-propylcyclohexyl trans,trans-4-propylcyclohexylcyclohexane-4'-carboxylate,
4% of trans-4-pentylcyclohexyl trans,trans-4-propylcyclohexylcyclohexane-4'-carboxylate,
4% of trans-4-propylcyclohexyl trans,trans-4-butylcyclohexylcyclohexane-4'-carboxylate,
4% of trans-4-pentylcyclohexyl trans,trans-4-butylcyclohexylcyclohexane-4'-carboxylate,
4% of 4,4'-bis-(trans-4-propylcyclohexyl)-biphenyl,
5% of 4-(trans-4-pentylcyclohexyl-4'-(trans-4-propylcyclohexyl)-biphenyl,
5% of 4-(trans-4-pentylcyclohexyl-4'-(trans-4-propylcyclohexyl)-2-fluorobiphenyl, 5% of 4,4'-bis(trans-4-propylcyclohexyl)-2-fluorobiphenyl and 5% of 4,4'-bis(trans-4-pentylcyclohexyl)-2-fluorobiphenyl shows S−N< −40°, cp. 105°, visc. 20, TD. 3.5, $K_1/K_1$ 1.23, tv 2.6 V and Δn 0.095.

EXAMPLE 2

A mixture of

7% of 3-fluoro-4-cyanophenyl p-ethylbenzoate,
7% of 3-fluoro-4-cyanophenyl p-propylbenzoate,
6% of 3-fluoro-4-cyanophenyl p-(5-pentyl-1,3-dioxan-2-yl)-benzoate,
15% of trans-1-p-methoxyphenyl-4-propylcyclohexane,
10% of trans-1-p-ethoxyphenyl-4-prdpylcyclohexane,
10% of trans,trans-4-propoxy-4'-propylcyclohexylcyclohexane,
8% of trans,trans-4-methoxy-4'-pentylcyclohexylcyclohexane,
11% of 4-ethyl-4'-(trans-4-propylcyclohexyl)-biphenyl,
10% of 4-ethyl-4'-(trans-4-pentylcyclohexyl)-biphenyl,
4% of 4,4'-bis-(trans-4-propylcyclohexyl)-biphenyl,
4% of 4,4'-bis-(trans-4-propylcyclohexyl)-2-fluorobiphenyl,
4% of 4-(trans-4-pentylcyclohexyl)-4'-(trans-4-propylcyclohexyl)-biphenyl and
of 4-(trans-4-pentylcyclohexyl)-4'-(trans-4-propylcyclohexyl)-2-fluorobiphenyl shows S−N < −40°, cp. 96°, visc. 21, TD. 3.4, tv 1.9 V and Δn 0.125.

EXAMPLE 3

A mixture of

5% of 3fluoro-4-cyanophenyL p-ethylbenzoate,
5% of 3-fluoro-4-cyanophenyl p-propylbenzoate,
5% of trans-1-p-propylphenyl-4-pentylcyclohexane,
21% of trans-1-p-methoxyphenyl-4-propylcyclohexane,
14% of trans-1-p-ethoxyphenyl-4-propylcyclohexane,
12% of 4-ethyl-4'-(trans-4-propylcyclohexyl)-biphenyl,
11% of 4-ethyl-4'-(trans-4-pentylcyclohexyl)-biphenyl,
4% of 4,4'-bis-(trans-4-propylcyclohexyl)-biphenyl,
4% of 4,4'-bis-(trans-4-propylcyclohexyl)-2-fluorobiphenyl,
5% of 4-(trans-4-pentylcyclohexyl)-4'-(trans-4-propylcyclohexyl)-biphenyl,
5% of 4-(trans-4-pentylcyclohexyl)-4'-(trans-4-propylcyclohexyl)-2-fluorobiphenyl and
5% of 4,4'-bis(trans-4-pentylcyclohexyl-2-fluorobiphenyl shows S−N < −40°, cp. 101°, visc. 18, $K_3/K_1$ 1.20, TD. 3.0, tv 2.8 V and Δn 0.131.

EXAMPLE 4

A mixture of

3% of 3-fluoro-4-cyanophenyl p-ethylbenzoate,
4% of 3-fluoro-4-cyanophenyl p-propylbenzoate,
3% of 3-fluoro-4-cyanophenyl p-(trans-4-propylcyclohexyl)-benzoate,
5% of trans-1-p-methoxyphenyl-4-propylcyclohexane,
5% of trans-1-p-methoxyphenyl-4-pentylcyclohexane,
21% of trans,trans-4-propoxy-4'-propylcyclohexylcyclohexane,
18% of trans,trans-4-methoxy-4'-pentylcyclohexylcyclohexane,
9% of trans,trans-4-ethoxy-4'-pentylcyclohexylcyclohexane,
5% of trans-4-propylcyclohexyl trans,trans-4-propylcyclohexylcyclohexane-4'-carboxylate,
5% of trans-4-pentylcyclohexyl trans,trans-4-propylcyclohexylcyclohexane-4'-carboxylate,
5% of trans-4-propylcyclohexyl trans,trans-4-butylcyclohexylcyclohexane-4'-carboxylate,
4% of trans-4-pentylcyclohexyl trans,trans-4-butylcyclohexylcyclohexane-4'-carboxylate,
4% of 4,4'-bis-(trans-4-propylcyclohexyl)-2-fluorobiphenyl,
4% of 4,4'-bis-(trans-4-pentylcyclohexyl)-2-fluorobiphenyl and
5% of 4-(trans-4-pentylcyclohexyl)-4'-(trans-4-propylcyclohexyl)-2-fluorobiphenyl shows S−N < −40°, cp. 92°, visc. 20, tv 2.5 V, TD. 4.7 and Δn 0.0775.

EXAMPLE 5

A mixture consisting of

5% of 3-fluoro-4-cyanophenyl p-ethylbenzoate,
5% of 3-fluoro-4-cyanophenyl p-propylbenzoate,
3% of trans-1-p-isothiocyanatophenyl-4-propylcyclohexane,
8% of trans-1-p-propylphenyl-4-pentylcyclohexane,
20% of trans-1-p-methoxyphenyl-4-propylcyclohexane,
13% of trans-1-p-ethoxyphenyl-4-propylcyclohexane,
12% of 4-ethyl-4'-(trans-4-propylcyc!ohexyl)-biphenyl,
11% of 4-ethyl-4'-(trans-4-pentylcyclohexyl)-biphenyl,
4% of 4,4'-bis-(trans-4-propylcyclohexyl)-biphenyl,
4% of 4,4'-bis-(trans-4-propylcyclohexyl)-2-fluorobiphenyl,
5% of 4-(trans-4-pentylcyclohexyl)-4'-(trans-4-propylcyclohexyl)-biphenyl,
5% of 4-(trans-4-pentylcyclohexyl)-4'-(trans-4-propylcyclohexyl)-2-fluorobiphenyl and
5% of 4,4'-bis(trans-4-pentylcyclohexyl)-2-fluorobiphenyl is prepared.

EXAMPLE 6

A mixture consisting of

4% of 3-fluoro-4-cyanophenyl p-ethylbenzoate,
4% of 3-fluoro-4-cyanophenyl p-propylbenzoate,
8% of trans-1-p-propylphenyl-4-pentylcyclohexane,
19% of trans-1-p-methoxyphenyl-4-propylcyclohexane,
13% of trans-1-p-ethoxyphenyl-4-propylcyclohexane,
12% of 4-ethyl-4'-(trans-4-propylcyclohexyl)-biphenyl,
11% of 4-ethyl-4'-(trans-pentylcyclohexyl)-biphenyl,
4% of 4,4'-bis-(trans-4-propylcyclohexyl)-biphenyl,
4% of 4,4'-bis-(trans-4-propylcyclohexyl)-2-fluorobiphenyl,
5% of 4-(trans-4-pentylcyclohexyl)-4'-(trans-4-propylcyclohexyl)-biphenyl,
5% of 4-(trans-4-pentylcyclohexyl)-4'-(trans-4-propylcyclohexyl)-2-fluorobiphenyl,
5% of 4,4'-bis(trans-4-pentylcyclohexyl)-2-fluorobiphenyl,
2% of trans,trans-4'-nitro-4-propylcyclohexylcyclohexane,
2% of trans-1-p-nitrophenyl-4-propylcyclohexane and
2% of 4-nitro-4'-(trans-4-pentylcyclohexyl)-biphenyl is prepared.

EXAMPLE 7

A mixture consisting of

5% of 3-fluoro-4-cyanophenyl p-ethylbenzoate,
5% of 3-fluoro-4-cyanophenyl p-propylbenzoate,
3% of trans,trans-4'-propyl-4-(4-cyano-3-fluorophenyl)-cyclohexylcyclohexane,
8% of trans-1-p-propylphenyl-4-pentylcyclohexane, 20% of trans-1-p-methoxyphenyl-4-propylcyclohexane,
13% of trans-1-p-ethoxyphenyl-4-propylcyclohexane,
12% of 4-ethyl-4'-(trans-4-propylcyclohexyl)-biphenyl,
11% of 4-ethyl-4'-(trans-4-pentylcyclohexyl)-biphenyl,
4% of 4,4'-bis-(trans-4-propylcyclohexyl)-biphenyl,
4% of 4,4'-bis-(trans-4-propylcyclohexyl)-2-fluorobiphenyl,
5% of 4-(trans-4-pentylcyclohexyl)-4'-(trans-4-propylcyclohexyl)-biphenyl,
5% of 4-(trans-4-pentylcyclohexyl)-4'-(trans-4-propylcyclohexyl)-2-fluorobiphenyl and
5% of 4,4'-bis(trans-4-pentylcyclohexyl)-2-fluorobiphenyl
is prepared.

EXAMPLE 8

A mixture of
3% of 3-fluoro-4-cyanophenyl p-ethylbenzoate,
4% of 3-fluoro-4-cyanophenyl p-propylbenzoate,
10% of 3-fluoro-4-cyanophenyl p-pentylbenzoate,
5% of 3-fluoro-4-cyanophenyl p-heptylbenzoate,
5% of 3-fluoro-4-cyanophenyl p-(trans-4-propylcyclohexyl)-benzoate,
6% of 3-fluoro-4-cyanophenyl p-(trans-4-butylcyclohexyl)-benzoate,
4% of 3-fluoro-4-cyanophenyl p-(trans-4-pentylcyclohexyl)-benzoate,
24% of trans-1-p-methoxyphenyl-4-propylcyclohexane,
14% of trans,trans-4'-propoxy-4-propylcyclohexylcyclohexane,
4% of 4-ethyl-4'-(trans-4-propylcyclohexyl)-biphenyl,
4% of 4-ethyl-4'-(trans-4-pentylcyclohexyl)-biphenyl,
4% of 4,4'-bis-(trans-4-propylcyclohexyl)-biphenyl,
4% of 4,4'-bis-(trans-4-propylcyclohexyl)-2-fluorobiphenyl,
5% of 4-(trans-4-pentylcyclohexyl)-4'-(trans-4-propylcyclohexyl)-biphenyl and
4% of 4-(trans-4-pentylcyclohexyl)-4'-(trans-4-propylcyclohexyl)-2-fluorobiphenyl
shows S—N < −40°, cp. 93°, visc. 31, Δn 0.131, tv 1.5 V and TD. 1.3.

EXAMPLE 9

A mixture of
4% of 3-fluoro-4-cyanophenyl p-ethylbenzoate,
6% 6% of 3-fluoro-4-cyanophenyl p-propylbenzoate,
12% of 3-fluoro-4-cyanophenyl p-pentylbenzoate,
6% of 3-fluoro-4-cyanophenyl p-heptylbenzoate,
5% of 3-fluoro-4-cyanophenyl p-(trans-4-propylcyclohexyl)-benzoate,
7% of 3-fluoro-4-cyanophenyl p-(trans-4-butylcyclohexyl)-benzoate,
4% of 3-fluoro-4-cyanophenyl p-(trans-4-pentylcyclohexyl)-benzoate,
18% of trans-1-p-methoxyphenyl-4-propylcyclohexane,
14% of trans,trans-4'-propoxy-4-propylcyclohexylcyclohexane,
4% of 4-ethyl-4'-(trans-4-propylcyclohexyl)-biphenyl,
3% of 4-ethyl-4'-(trans-4-pentylcyclohexyl)-biphenyl,
4% of 4,4'-bis-(trans-4-propylcyclohexyl)-biphenyl,
5% of 4,4'-bis-(trans-4-propylcyclohexyl)-2-fluorobiphenyl,
4% of 4-(trans-4-pentylcyclohexyl)-4'-(trans-4-propylcyclohexyl)-biphenyl and
4% of 4-(trans-4-pentylcyclohexyl)-4'-(trans-4-propylcyclohexyl)-2-fluorobiphenyl
shows S—N < −30°, cp. 94°, visc. 38, Δn 0.137, tv 1.2 V and TD. 1.2.

EXAMPLE 10

A mixture of
5% of 3-fluoro-4-cyanophenyl p-ethylbenzoate,
7% of 3-fluoro-4-cyanophenyl p-propylbenzoate,
15% of 3-fluoro-4-cyanophenyl p-pentylbenzoate,
6% of 3-fluoro-4-cyanophenyl p-heptylbenzoate,
5% of 3-fluoro-4-cyanophenyl p-(trans-4-propylcyclohexyl)-benzoate,
7% of 3-fluoro-4-cyanophenyl p-(trans-4-butylcyclohexyl)-benzoate,
5% of 3-fluoro-4-cyanophenyl p-(trans-4-pentylcyclohexyl)-benzoate,
12% of trans-1-p-methoxyphenyl-4-propylcyclohexane,
14% of trans,trans-4'-propoxy-4-propylcyclohexylcyclohexane,
4% of 4-ethyl-4'-(trans-4-propylcyclohexyl)-biphenyl,
3% of 4-ethyl-4'-(trans-4-pentylcyclohexyl)-biphenyl,
4% of 4,4'-bis-(trans-4-propylcyclohexyl)-biphenyl,
5% of 4,4'-bis-(trans-4-propylcyclohexyl)-2-fluorobiphenyl,
4% of 4-(trans-4-pentylcyclohexyl)-4'-(trans-4-propylcyclohexyl)-biphenyl and
4% of 4-(trans-4-pentylcyclohexyl)-4'-(trans-4-propylcyclohexyl)-2-fluorobiphenyl
shows S—N < −30°, cp. 96°, visc. 47, Δn 0.143, tv 1.2 V and TD. 0.7.

EXAMPLE 11

A mixture of
5% of 3-fluoro-4-cyanophenyl p-ethylbenzoate,
5% of 3-fluoro-4-cyanophenyl p-propylbenzoate,
8% of 3-fluoro-4-cyanophenyl p-pentylbenzoate,
8% of 3-fluoro-4-cyanophenyl p-(trans-4-propylcyclohexyl)-benzoate,
5% of 3-fluoro-4-cyanophenyl p-(trans-4-butylcyclohexyl)-benzoate,
5% of 2-p-pentyloxyphenyl-5-hexylpyrimidine,
5% of 2-p-hexyloxyphenyl-5-hexylpyrimidine,
5% of 2-p-heptyloxyphenyl-5-hexylpyrimidine,
5% of 2-p-nonyloxyphenyl-5-hexylpyrimidine,
5% of 2-p-heptyloxyphenyl-5-heptylpyrimidine,
5% of 2-p-nonyloxyphenyl-5-heptylpyrimidine,
16% of p-trans-4-propylcyclohexylphenyl butyrate,
13% of trans-1-p-propylphenyl-4-pentylcyclohexane,
6% of 4-(trans-4-pentylcyclohexyl)-4'-(trans-4-propylcyclohexyl)-2-fluorobiphenyl and
4% of 4,4'-bis-(trans-4-pentylcyclohexyl)-2-fluorobiphenyl
shows S—N < −30°, cp. 65°, visc. 52, Δn 0.136, $K_3/K_1$ 0.79, tv 1.5 V and TD. 8.

EXAMPLE 12

A mixture of
4% of 3-fluoro-4-cyanophenyl p-ethylbenzoate,
5% of 3-fLuoro-4-cyanophenyl p-propylbenzoate,
5% of 2-(3-fluoro-4-cyanophenyl)-5-hexylpyrimidine,
4% of 2-(3-fluoro-4-cyanophenyl)-5-heptylpyrimidine,
11% of 4-ethyl-4'-(trans-4-propylcyclohexyl)-biphenyl,
11% of 4-ethyl-4'-(trans-4-pentylcyclohexyl)-biphenyl,
5% of 2-p-pentyloxyphenyl-5-hexylpyrimidine,
5% of 2-p-hexyloxyphenyl-5-hexylpyrimidine,
5% of 2-p-heptyloxyphenyl-5-hexylpyrimidine,
5% of 2-p-nonyloxyphenyl-5-hexylpyrimidine,
5% of 2-p-heptyloxyphenyl-5-heptylpyrimidine,
5% of 2-p-nonyloxyphenyl-5-heptylpyrimidine,
4% of 4-(trans-4-pentylcyclohexyl)-4'-(trans-4-propylcyclohexyl)-2-fluorobiphenyl, 11% of trans-1-p-methoxyphenyl-4-propylcyclohexane and
15% of trans-1-p-ethoxyphenyl-4-propylcyclohexane
shows cp. 65°, visc. 36, tv 1.9 V, $K_3/K_1$ 0.74 and $\Delta n$ 0.143.

EXAMPLE 13

A mixture consisting of
4% of 3-fluoro-4-cyanophenyl p-ethylbenzoate,
5% of 3-fluoro-4-cyanophenyl p-propylbenzoate,
5% of 2-(3-fluoro-4-cyanophenyl)-5-hexylpyrimidine,
4% of 2-(3-fluoro-4-cyanophenyl)-5-heptylpyrimidine,
11% of 4-ethyl-4'-(trans-4-propylcyclohexyl)-biphenyl,
11% of 4-ethyl-4'-(trans-4-pentylcyclohexyl)-biphenyl,
5% of 2-p-pentylphenyl-5-hexylpyrimidine,
5% of 2-p-hexylphenyl-5-hexylpyrimidine,
5% of 2-p-heptyloxyphenyl-5-hexylpyrimidine,
5% of 2-p-nonyloxyphenyl-5-hexylpyrimidine,
5% of 2-p-heptyloxyphenyl-5-heptylpyrimidine,
5% of 2-p-nonyloxyphenyl-5-heptylpyrimidine,
4% of 4-(trans-4-pentylcyclohexyl)-4'-(trans-4-propylcyclohexyl)-2-fluorobiphenyl,
11% of trans-1-p-methoxyphenyl-4-propylcyclohexane and
15% of trans-1-p-ethoxyphenyl-4-propylcyclohexane
is prepared.

EXAMPLE 14

A mixture of
5% of 3-fluoro-4-cyanophenyl p-ethylbenzoate,
6% of 3-fluoro-4-cyanophenyl p-propylbenzoate,
8% of 3-fluoro-4-cyanophenyl p-pentylbenzoate,
8% of 3-fluoro-4-cyanophenyl p-(trans-4-propylcyclohexyl)-benzoate
7% of 3-fluoro-4-cyanophenyl p-(trans-4-butylcyclohexyl)-benzoate,
5% of 2-p-butoxyphenyl-5-propyl-1,3-dioxane,
5% of 2-p-butoxyphenyl-5-pentyl-1,3-dioxane,
5% of 2-P-heptyloxyphenyl-5-hexylpyrimidine,
5% of 2-P-nonyloxyphenyl-5-hexylpyrimidine,
5% of 2-P-heptyloxyphenyl-5-heptylpyrimidine,
5% of 2-P-nonyloxyphenyl-5-heptylpyrimidine,
13% of p-trans-4-propylcyclohexylphenyl butyrate,
13% of trans-1-p-propylphenyl-4-pentylcyclohexane,
6% (trans-4-pentylcyclohexyl)-4'-(trans-4-propylcyclohexyl)-2-fluorobiphenyl and
4% of 4,4'-bis-(trans-4-pentylcyclohexyl)-2-fluorobiphenyl,
shows S—N < —30°, cp. 66°, visc. 52, $K_3/K_1$ 0.89, $\Delta n$ 0.131, tv 1.4 V and TD. 5.8.

EXAMPLE 15

A mixture consisting of
5% of 3-fluoro-4-cyanophenyl p-ethylbenzoate,
6% of 3-fluoro-4-cyanophenyl p-propylbenzoate,
8% of 3-fluoro-4-cyanophenyl p-pentylbenzoate,
8% of 3-fluoro-4-cyanophenyl p-(trans-4-propylcyclohexyl)-benzoate,
7% of 3-fluoro-4-cyanophenyl p-(trans-4-butylcyclohexyl)-butyrate,
5% of 2-p-nitrophenyl-5-heptylpyrimidine,
5% of 2-p-nitrophenyl-5-nonylpyrimidine,
5% of 2-p-heptyloxyphenyl-5-hexylpyrimidine,
5% of 2-p-nonyloxyphenyl-5-hexylpyrimidine,
5% of 2-p-heptyloxyphenyl-5-heptylpyrimidine,
5% of 2-p-nonyloxyphenyl-5-heptylpyrimidine,
13% of p-trans-4-propylcyclohexylphenyl butyrate,
13% of trans-1-p-propylphenyl-4-pentylcyclohexane,
6% of 4-(trans-4-pentylcyclohexyl)-4'-(trans-4-propylcyclohexyl)-2-fluorobiphenyl and
4% of 4,4'-bis-(trans-4-pentylcyclohexyl)-2-fluorobiphenyl
is prepared.

EXAMPLE 16

A mixture consisting of
3% of 3-fluoro-4-cyanophenyl p-ethylbenzoate,
3% of 3-fluoro-4-cyanophenyl p-propylbenzoate,
8% of 3-fluoro-4-cyanophenyl p-pentylbenzoate,
4% of 3-fluoro-4-cyanophenyl p-heptylbenzoate,
5% of 3-fluoro-4-cyanophenyl p-(trans-4-propylcyclohexyl)-benzoate,
6% of 3-fluoro-4-cyanophenyl p-(trans-4-butylcyclohexyl)-benzoate,
4% of 3-fluoro-4-cyanophenyl p-(trans-4-pentylcyclohexyl)-benzoate,
24% of trans-1-p-methoxyphenyl-4-propylcyclohexane,
14% of trans,trans-4'-propoxy-4-propylcyclohexylcyclohexane,
4% of 4-ethyl-4'-(trans-4-propylcyclohexyl)-biphenyl,
4% of 4-ethyl-4'-(trans-4-pentylcyclohexyl)-biphenyl,
4% of 4,4'-bis-(trans-4-propylcyclohexyl)-biphenyl,
4% of 4,4'-bis-(trans-4-propylcyclohexyl)-2-fluorobiphenyl,
5% of 4-(trans-4-pentylcyclohexyl)-4'-(trans-4-propylcyclohexyl)-triphenyl,
4% of 4-(trans-4-pentylcyclohexyl)-4'-(trans-4-propylcyclohexyl)-2-fluorobiphenyl and
3% of trans,trans-4'-propyl-4-(p-cyanophenyl)-cyclohexylcyclohexane
is prepared.

EXAMPLE 17

A mixture consisting of
3% of 3-fluoro-4-cyanophenyl p-ethylbenzoate,
4% of 3-fluoro-4-cyanophenyl p-propylbenzoate,
9% of 3-fluoro-4-cyanophenyl p-pentylbenzoate,
4% of 3-fluoro-4-cyanophenyl p-heptylbenzoate,
4% of 3-fluoro-4-cyanophenyl p-(trans-4-propylcyclohexyl)-benzoate,
5% of fluoro-4-cyanophenyl p-(trans-4-butylcyclohexyl)-benzoate,
3% of 3-fluoro-4-cyanophenyl p-(trans-4-pentylcyclohexyl)-benzoate,
24% of trans-1-p-methoxyphenyl-4-propylcyclohexane,
14% of trans,trans-4'-propoxy-4-propylcyclohexylcyclohexane,
4% of 4-ethyl-4'-(trans-4-propylcyclohexyl)-biphenyl,
4% of 4-ethyl-4'-(trans-4-pentylcyclohexyl)-biphenyl,
4% of 4,4'-bis-(trans-4-propylcyclohexyl)-biphenyl,
4% of 4,4'-bis-(trans-4-propylcyclohexyl)-2-fluorobiphenyl,
5% of 4-(trans-4-pentylcyclohexyl)-4'-(trans-4-propylcyclohexyl)-biphenyl,
4% of 4-(trans-4-pentylcyclohexyl)-4'-(trans-4-propylcyclohexyl)-2-fluorobiphenyl and
5% of 4-ethyl-4'-cyanobiphenyl
is prepared.

EXAMPLE 18

A mixture consisting of
2% of 3-fluoro-4-cyanophenyl p-ethylbenzoate,
3% of 3-fluoro-4-cyanophenyl p-propylbenzoate,
9% of 3-fluoro-4-cyanophenyl p-pentylbenzoate,
4% of 3-fluoro-4-cyanophenyl p-heptylbenzoate, 4% of 3-fluoro-4-cyanophenyl p-(trans-4-propylcylohexyl)-benzoate,
5% of 3-fluoro-4-cyanophenyl p-(trans-4-butylcyclohexyl)-benzoate,
25 3% of 3-fluoro-4-cyanophenyl p-(trans-4-pentylcyclohexyl)-benzoate,
24% of trans-1-p-methoxyphenyl-4-propylcyclohexane,
14% trans-4'-propoxy-4-propylcyclohexylcyclohexane,
4% of 4-ethyl-4'-(trans-4-propylcyclohexyl)-biphenyl,
4% of 4-ethyl-4'-(trans-4-pentylcyclohexyl)-biphenyl,
4% of 4,4'-bis-(trans-4-propylcyclohexyl)-biphenyl,
4% of 4,4'-bis-(trans-4-propylcyclohexyl)-2-fluorobiphenyl,
5% of 4-(trans-4-pentylcyclohexyl)-4'-(trans-4-propylcyclohexyl)-biphenyl,
4% of 4-(trans-4-pentylcyclohexyl)-4'-(trans-4-propylcyclohexyl)-2-fluorobiphenyl and
7% of p-trans-4-pentylcyclohexylbenzonitrile
is prepared.

EXAMPLE 19

A mixture consisting of
2% of 3-fluoro-4-cyanophenyl p-ethylbenzoate,
3% of 3-fluoro-4-cyanophenyl p-propylbenzoate,
8% of 3-fluoro-4-cyanophenyl p-pentylbenzoate,
3% of 3-fluoro-4-cyanophenyl p-heptylbenzoate,
3% of 3-fluoro-4-cyanophenyl p-(trans-4-propylcyclohexyl)-benzoate,
5% of 3-fluoro-4-cyanophenyl p-(trans-4-butylcyclohexyl)-benzoate,
3% of 3-fluoro-4-cyanophenyl p-(trans-4-pentylcyclohexyl)-benzoate,
24% of trans-1-p-methoxyphenyl-4-propylcyclohexane,
14% of trans,trans-4'-propoxy-4-propylcyclohexylcyclohexane,
4% of 4-ethyl-4'-(trans-4-propylcyclohexyl)-biphenyl,
4% of 4-ethyl-4'-(trans-4-pentylcyclohexyl)-biphenyl,
4% of 4,4'-bis-(trans-4-propylcyclohexyl)-biphenyl,
4% of 4,4'-bis-(trans-4-propylcyclohexyl)-2-fluorobiphenyl,
5% of 4-(trans-4-pentylcyclohexyl)-4'-(trans-4-propylcyclohexyl)-biphenyl,
4% of 4-(trans-4-pentylcyclohexyl)-4'-(trans-4-propylcyclohexyl)-2-fluorobiphenyl and
10% of 4-cyanophenyl p-propylbenzoate
is prepared.

EXAMPLE 20

A mixture consisting of
5% of 3-fluoro-4-cyanophenyl p-ethylbenzoate,
5% of 3-fluoro-4-cyanophenyl p-propylbenzoate,
3% of trans-1-(trans-4-isothiocyanatocyclohexyl)-4-propylcyclohexane,
8% of trans-1-p-propylphenyl-4-pentylcyclohexane,
20% of trans-1-p-methoxyphenyl-4-propylcyclohexane,
13% of trans-1-p-ethoxyphenyl-4-propylcyclohexane,
12% of 4-ethyl-4'-(trans-4-propylcyclohexyl)-biphenyl,
11% of 4-ethyl-4'-(trans-4-pentylcyclohexyl)-biphenyl,
4% of 4,4'-bis-(trans-4-propylcyclohexyl)-biphenyl,
4% of 4,4'-bis-(trans-4-propylcyclohexyl)-2-fluorobiphenyl,
5% of 4-(trans-4-pentylcyclohexyl)-4'-(trans-4-propylcyclohexyl)-biphenyl,
5% of 4-(trans-4-pentylcyclohexyl)-4'-(trans-4-propylcyclohexyl)-2-fluorobiphenyl and
5% of 4,4'-bis(trans-4-pentylcyclohexyl)-2-fluorobiphenyl
is prepared.

EXAMPLE 21

A mixture consisting of
4% of 3-fluoro-4-cyanophenyl p-ethylbenzoate,
5% of 3-fluoro-4-cyanophenyl p-propylbenzoate,
5% of 2-(3-fluoro-4-cyanophenyl)-5-hexylpyrimidine,
4% of 2-(3-fluoro-4-cyanophenyl)-5-heptylpyrimidine,
11% of 4-ethyl-4'-(trans-4-propylcyclohexyl)-biphenyl,
11% of 4-ethyl-4'-(trans-4-pentylcyclohexyl)-biphenyl,
5% of 2-p-pentylphenyl-5-hexylpyridine,
5% of 2-p-hexylphenyl-5-hexylpyridine,
5% of 2-p-heptyloxyphenyl-5-hexylpyridine,
5% of 2-p-nonyloxyphenyl-5-hexylpyrimidine,
5% of 2-p-heptyloxyphenyl-5-heptylpyrimidine,
5% of 2-p-nonyloxyphenyl-5-heptylpyrimidine,
4% of 4-(trans-4-pentylcyclohexyl)-4'-(trans-4-propylcyclohexyl)-2-fluorobiphenyl,
11% of trans-1-p-methoxyphenyl-4-propylcyclohexane and
15%
5% of trans-1-p-ethoxyphenyl-4-propylcyclohexane
is prepared.

The mixtures from Examples 1 to 21 show a particularly low temperature-dependence of the threshold voltage in LC display elements (as described).

The preceding examples relate in particular to wide-range mixtures (Examples 1 to 7 and 20), wide-range mixtures with a low threshold voltage (Examples 8 to 10 and to 19) and mixtures for high multiplex ratios (Examples to 15 and 21).

We claim:

1. A liquid crystal electrooptical display element with a low temperature-dependence of the threshold voltage and containing a liquid crystal phase consisting essentially of at least one component (A) with a reduced degree of association which is one or more compounds of the formula (1)

$$R-(Q^1-Z')_n-Q^2-Z''-Q^4 \qquad (1)$$

in which
R is alkyl with 2 to 9 C atoms, in which one or two non-adjacent $CH_2$ groups can also be replaced by —O—, —CO—, —O—CO—, —CO—O— and/or —CH=CH (trans),
Z' and Z'' are each —CO—O—, —O—CO—, —$CH_2CH_2$, $CH_2O$, —$OCH_2$— or a single bond,
n is 0, 1 or 2,
$Q^1$ and $Q^2$ each independently of one another are trans- 1,4-cyclohexylene, in which one or two non-adjacent $CH_2$ groups can also be replaced by —O— and/or —S—, or 1,4-phenylene, in which one or more CH groups can also be replaced by N, and
$Q^4$ is 3-halogeno-4-cyanophenyl, 3-halogeno-4-isothiocyanatophenyl, 3,4-dihalogenophenyl, p-nitrophenyl, trans-4-nitrocyclohexyl, trans-4-isothiocyanatocyclohexyl or p-isothiocyanatophenyl, components chosen from at least two of the following groups B, C and D: Group B, compounds of the formulae I and II

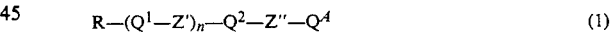

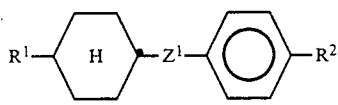   I

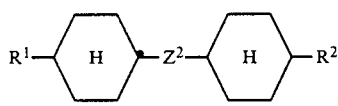   II in which
R¹ and R² each independently of one another are alkyl with 1 to 7 C atoms, in which one or two non-adjacent CH₂ groups can also be replaced by —O—, —CO—, —O—CH—, —CO—O— and/or —CH=CH— (trans) and
Z¹ and Z² are each —CO—O—, —CH₂—O, —CH₂CH₂— or a single bond,
group C, compounds of the formulae III to VI

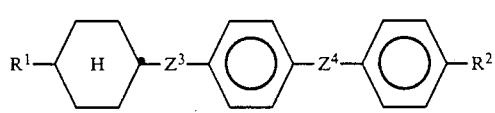   III

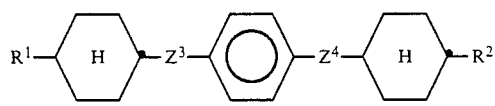   IV

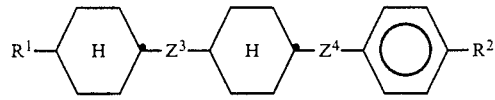   V or,

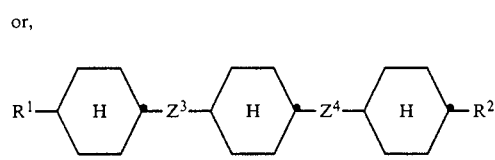   VI in which
R¹ and R² each independently of one another are alkyl with 1 to 7 C atoms, in which one or two non-adjacent CH₂ groups can also be replaced by —O—, —CO—, —O—CO—, —CO—O— and/or —CH=CH— (trans), and
Z³ and Z⁴ each independently of one another are —CO—O—, —O—CO—, —CH₂CH₂— or a single bond,
group D, compounds of the formulae VII to XI

R¹—A¹—Z¹—A²—A³—Z³—A⁴—R²   VII

R¹—A¹—Z¹—A²—Z²—A³—A⁴—R²   VIII

R¹—A¹—Z¹—A²—A³—A⁴—R²   IX

R¹—A¹—A²—Z²—A³—A⁴—R²   X or,

R¹—A¹—A²—A³—A⁴—R²   XI in which
R¹ and R² each independently of one another are alkyl with 1 to 7 C atoms, in which one or two non-adjacent CH₂ groups can also be replaced by —O—, —CO—, —O—CO—, —CO—O— and/or —CH=CH— (trans),
A¹, A²,
A³ and A⁴ each independently of one another are trans-1,4-cyclohexylene or 1,4-phenylene which is unsubstituted or substituted by one or two F or Cl atoms and/or CH₃ or CN groups,
Z¹, Z²
and Z³ each independently of one another are —CO—O—, —O—CO—, —CH₂CH₂—, —CH₂O—, —OCH₂— or a single bond,
and at most 7% of components, other than those of the formula 1, which have a positive dielectric anisotropy (Δε) greater than 5 and which are selected from group F, compounds of the formulae XVIII to XXV:

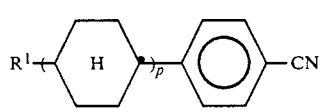   XVIII

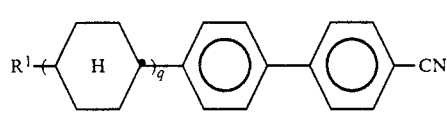   XIX

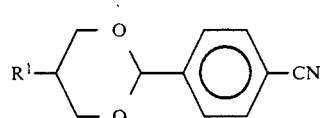   XX

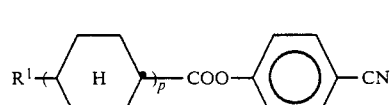   XXI

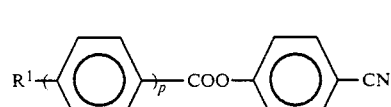   XXII

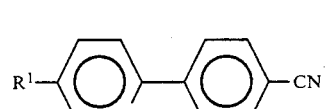   XXIII

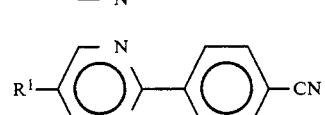   XXIV or,

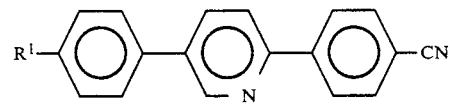   XXV in which
R¹ is alkyl of 1 to 10 C atoms, in which one or two non-adjacent CH₂ groups can also be replaced by —O—, —CO—, —O—CO—, —CO—O— and/or —CH=CH—(trans), and
p is 1 or 2 and
l is 0, 1 or 2.
2. An electrooptical display element as claimed in claim 1, wherein in the compounds of the formula 1, R is straight-chain alkyl or oxaalkyl with 2 to 7 C atoms, Z' is a single bond, Z" is —CO—O—, —CH₂O— or a single bond, n is 0 or 1, Q¹ is trans-1,4-cyclohexylene, 1,4-phenylene or pyrimidine-2,5-diyl and Q² is trans-1,4-cyclohexylene or 1,4phenylene.

3. An electrooptical display element as claimed in claim 1, wherein in said liquid crystal phase the total amount of compounds of the formula 1 is 10 to 50%.

4. An electrooptical display element as claimed in claim 1, wherein in said liquid crystal phase, the compounds of the formula 1are selected from the following subformulae:

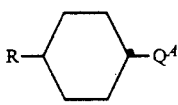   1d

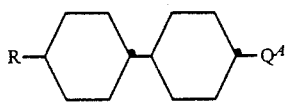   1e

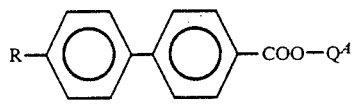   1g

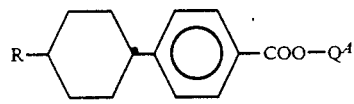   1i

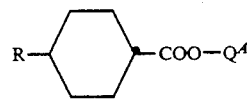   1k

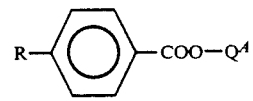   1l

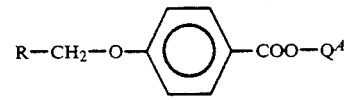   1m

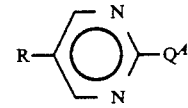   1o

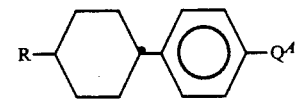   1t

5. An electrooptical display element as claimed in claim 1, wherein in said compounds of the formula 1, Q⁴ is 3-halogeno-4-cyanophenyl, 3-halogeno-4-isothiocyanatophenyl or 3,4-dihalogenophenyl.

6. An electrooptical display element as claimed in claim 1, wherein said liquid crystal phase contains at least one compound of the formula 1 in which n is 0 and at the same time at least one compound of the formula I in which n is 1.

7. An electrooptical display element as claimed in claim 1 wherein said liquid crystal phase contains at least one component of the formulae H and/or I

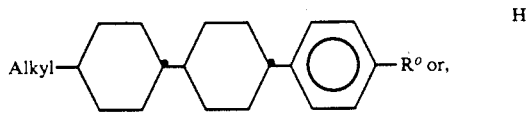   H

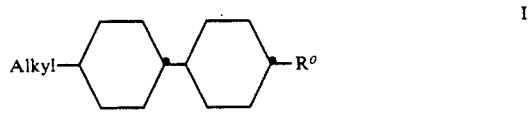   I wherein Alkyl is a straight-chain alkyl group with 1 to 7 C atoms and R⁰ is a straight-chain alkyl or alkoxy group or an oxalkyl or alkenyl group with 1 to 7 C atoms.

8. An electrooptical display element as claimed in claim 1, wherein in said liquid crystal phase the group B comprises components of the following subformulae:

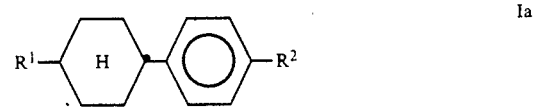   Ia

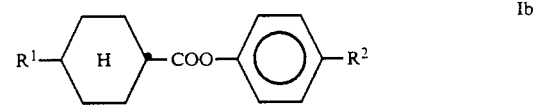   Ib

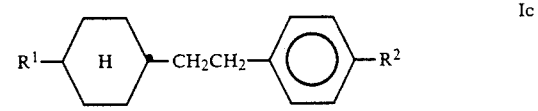   Ic

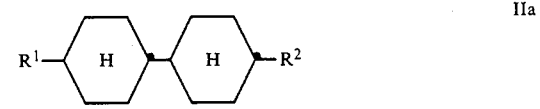   IIa

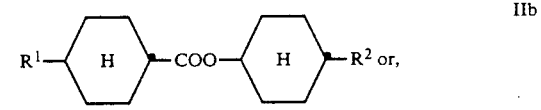   IIb

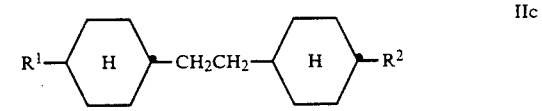   IIc wherein R¹ and R² each independently of one another are straight-chain alkyl, alkoxy, oxaalkyl, alkanoyloxy or trans-alkenyl with in each case 2 to 7 C atoms.

9. An electrooptical display element as claimed in claim 1, wherein in said liquid crystal phase the group C comprises components of the following subformulae:

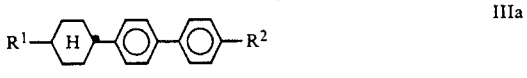   IIIa

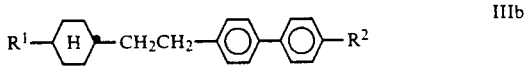   IIIb

-continued

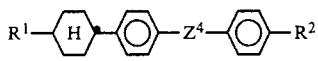 IIIc

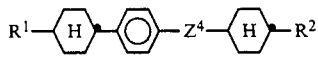 IVa

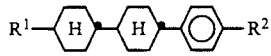 Va

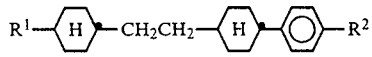 Vb

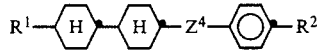 Vc

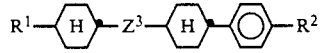 Vd

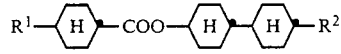 VIa

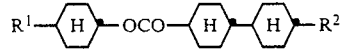 VIb

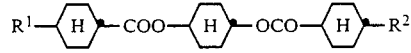 VIc

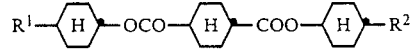 VId

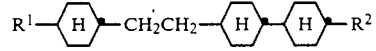 VIe

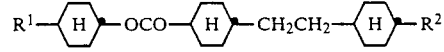 VIf

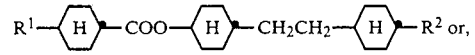 VIg

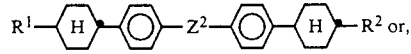 VIh wherein $R^1$ and $R^2$ each independently of one another are straight-chain alkyl, alkoxy, oxaalkyl, alkanoyloxy or trans-alkenyl with in each case 2 to 7 C atoms.

10. An electrooptical display element as claimed in claim 1, wherein in said liquid crystal phase the group D comprises compounds of the subformulae:

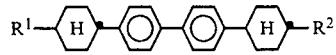

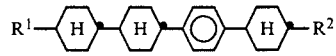

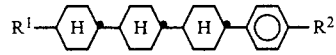

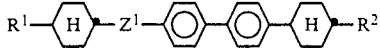

-continued and laterally monofluorinated analogs;
wherein $R^1$ and $R^2$ each independently of one another are straight-chain alkyl, alkoxy, oxaalkyl, alkanoyloxy or trans-alkenyl with in each case 2 to 7 C atoms.

11. An electrooptical display element as claimed in claim 1, wherein said liquid crystal phase comprises components selected from the group B and from group C or D.

12. An electrooptical display element as claimed in claim 1, wherein said liquid crystal phase comprises components from groups B, C and D.

13. An electrooptical display element as claimed in claim 1, wherein said liquid crystal phase consists essentially of compounds of the formula 1and components from the groups B, C and D.

14. A liquid crystal phase consisting essentially of at least one component A with a reduced degree of association which is one or more compounds of the formula 1

$$R-(Q^1-Z')_n-Q^2-Z''-Q^4 \tag{1}$$

in which
R is alkyl with 2 to 9 C atoms, in which one or two non-adjacent $CH_2$ groups can also be replaced by —O—, —CO—, —O—CO—, —CO—O— and/or —CH=CH (trans),
Z' and Z" are each —CO—O—, —O—CO—, —$CH_2CH_2$—, $CH_2O$, —$OCH_2$— is a single bond,
n is 0, 1 or 2,
$Q^1$ and $Q^2$ each independently of one another are trans-1,4-cyclohexylene, in which one or two non-adjacent $CH_2$ groups can also be replaced by —O— and/or —S—, or 1,4-phenylene, in which one or more CH groups can also be replaced by N, and
$Q^4$ is 3-halogeno-4-cyanophenyl, 3-halogeno-4-isothiocyanatophenyl, 3,4-dihalogenophenyl, p-nitrophenyl, trans-4-nitrocyclohexyl, trans-4-isothiocyanatocyclohexyl or p-isothiocyanatophenyl, and components chosen from at least two of the following groups B, C and D: Group B, compounds of the formulae I and II

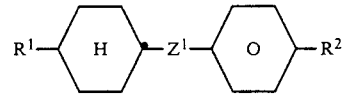 I or,

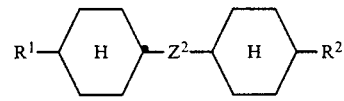 II in which p1 $R^1$ and $R^2$ each independently of one another are alkyl with 1 to 7 C atoms, in which one or two non-adjacent $CH_2$ groups can also be replaced by —O—, —CO—, —O—CO—, —CO—O— and/or —CH=CH— (trans) and
$Z^1$ and $Z^2$ are each —CO—O—, —$CH_2$—O, —$CH_2CH_2$— or a single bond, group C, compounds of the formulae III to VI

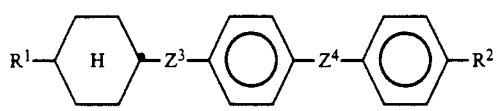  III

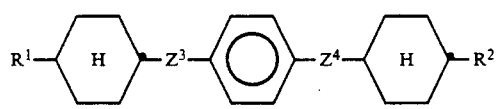  IV

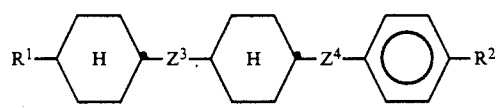  V or,

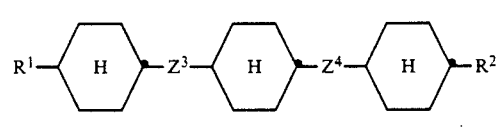  VI in which

R$^1$ and R$^2$ each independently of one another are alkyl with 1 to 7 C atoms, in which one or two non-adjacent CH$_2$ groups can also be replaced by —O—, —CO—, —O—CO—, —CO—O— and/or —CH=CH— (trans), and Z$^3$ and Z$^4$ each independently of one another are —CO—O—, —O—CO—, —CH$_2$CH$_2$— or a single bond, group D, compounds of the formulae VII to XI

R$^1$—A$^1$—Z$^1$—A$^2$—A$^3$—Z$^3$—A$^4$—R$^2$     VII

R$^1$—A$^1$—Z$^1$—A$^2$—Z$^2$—A$^3$—A$^4$—R$^2$     VIII

R$^1$—A$^1$—Z$^1$—A$^2$—A$^3$—A$^4$—R$^2$     IX

R$^1$—A$^1$—A$^2$—Z$^2$—A$^3$—A$^4$—R$^2$     X or,

R$^1$—A$^1$—A$^2$—A$^3$—A$^4$—R$^2$     XI in which

R$^1$ and R$^2$ each independently of one another are alkyl with 1 to 7 C atoms, in which one or two non-adjacent CH$_2$ groups can also be replaced by —O—, —CO—, —O—CO—, —CO—O— and/or —CH=CH— (trans), A$^1$, A$^2$, A$^3$ and A$^4$ each independently of one another are trans-1,4-cyclohexylene or 1,4-phenylene which is unsubstituted or substituted by one or two F or Cl atoms and/or CH$_3$ or CN groups, A$^1$, Z$^2$ and Z$^3$ $^1$ each independently of one another are —CO—O—, —O—CO—, —CH$_2$CH$_2$—, —CH$_2$O—, —OCH$_2$— or a single bond.

15. AN electrooptical display element as claimed in claim 1, which contains, in addition to components selected from groups A, B, C and D, not more than 5% of components with a clearly positive dielectric anisotropy (Δε) greater than 5.

16. An electrooptical display element as claimed in claim 1, which contains, in addition to components selected from groups A, B, C and D, not more than 3% of components with a clearly positive dielectric anisotropy (Δε) greater than 5.

* * * * *

UNITED STATES PATENT AND TRADEMARK OFFICE
CERTIFICATE OF CORRECTION

PATENT NO. : 5,030,383

DATED : July 9, 1991

INVENTOR(S) : Scheuble et al.

It is certified that error appears in the above-identified patent and that said Letters Patent is hereby corrected as shown below:

Column 24

Claim 1 line 66 reads .......

1 is o, 1 or 2.

Should read ;

q is o, 1 or 2.

Signed and Sealed this

Seventeenth Day of November, 1992

Attest:

DOUGLAS B. COMER

*Attesting Officer*　　　　　*Acting Commissioner of Patents and Trademarks*